Feb. 6, 1940.                    M. SLEETH                    2,189,477
CARD GAME
Filed June 29, 1937            4 Sheets-Sheet 1

INVENTOR.
Mont Sleeth
BY
ATTORNEYS.

Feb. 6, 1940. M. SLEETH 2,189,477
CARD GAME
Filed June 29, 1937 4 Sheets-Sheet 2
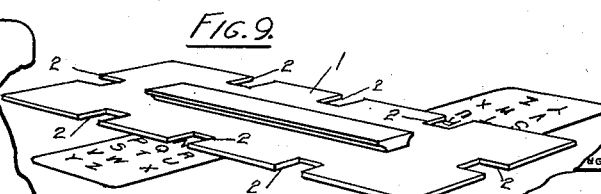
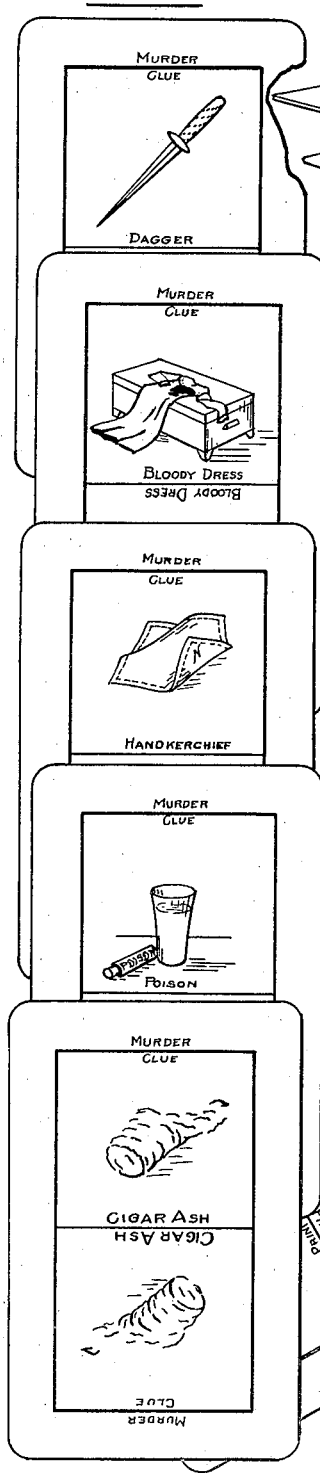
Mont Sleeth
INVENTOR.
BY
ATTORNEYS.

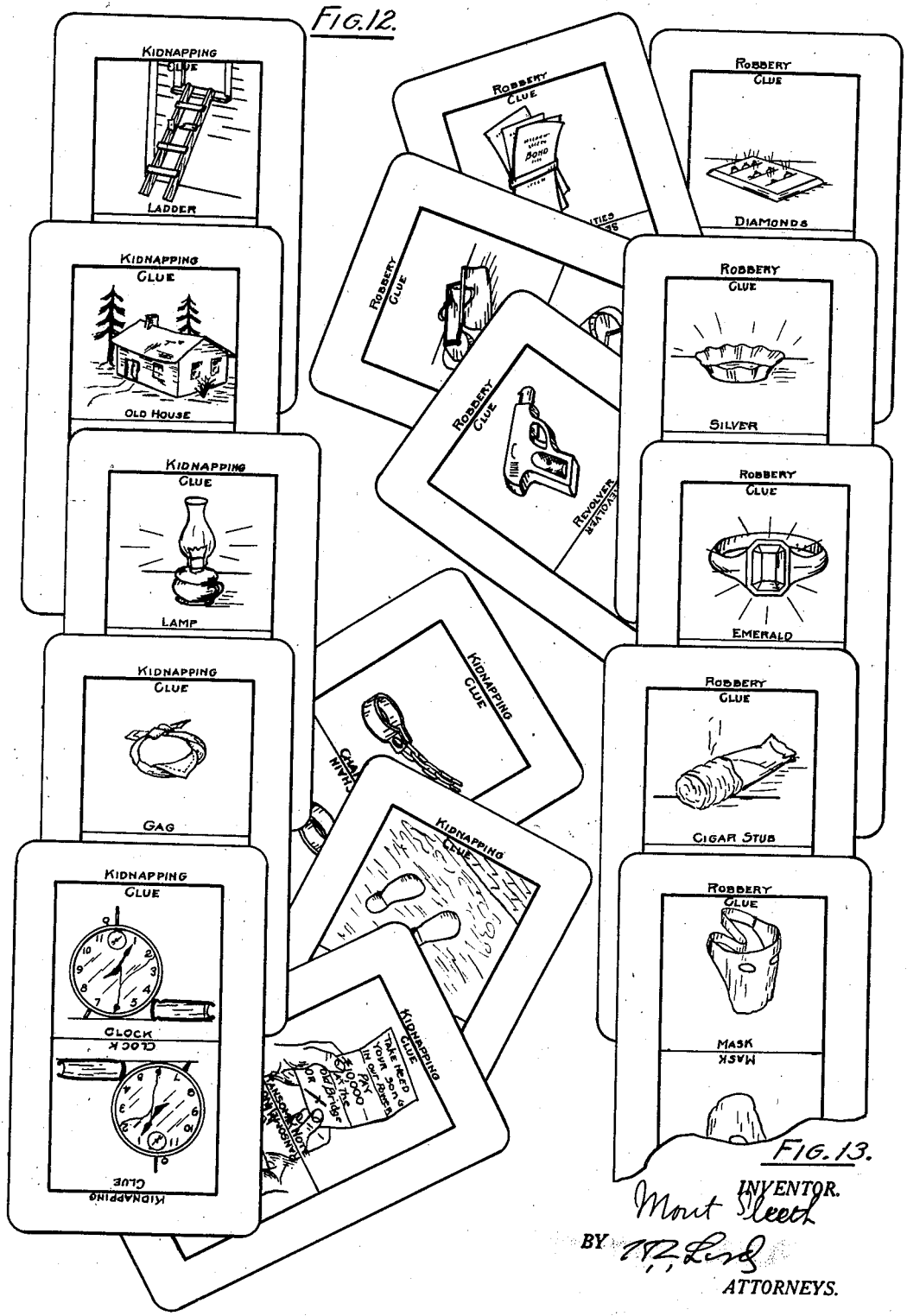

Feb. 6, 1940. M. SLEETH 2,189,477
CARD GAME
Filed June 29, 1937 4 Sheets-Sheet 4

Mont Sleeth
INVENTOR.

BY
ATTORNEYS.

Patented Feb. 6, 1940

2,189,477

UNITED STATES PATENT OFFICE 2,189,477

CARD GAME

Mont Sleeth, Cambridge Springs, Pa.

Application June 29, 1937, Serial No. 150,968

5 Claims. (Cl. 273—152)

The present invention is designed to provide a game of cards of peculiar characteristics. As exemplified it is adapted to depicting various crimes involving the accused and accuser and relating these with clues disclosed by a cipher and identified through keys distributed in pairs and recognizable by the characteristics of the keys. Features and details of the invention will appear from the specification and claims.

Figures 1, 2:
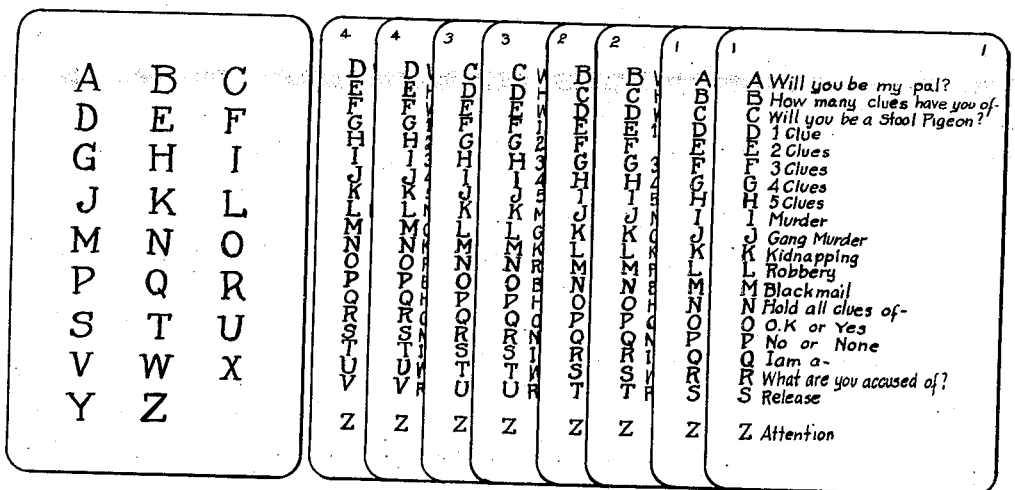

A preferred embodiment of the cards is illustrated in the accompanying drawings as follows:

Fig. 1 shows a view of a cipher card.

Fig. 2 a view of a key card.

Figure 3:

Fig. 3 a card representing a detective and the accuser.

Figure 4:
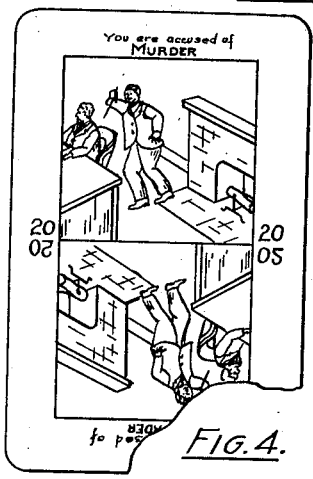

Fig. 4 a card indicating murder and the accused.

Figure 5:
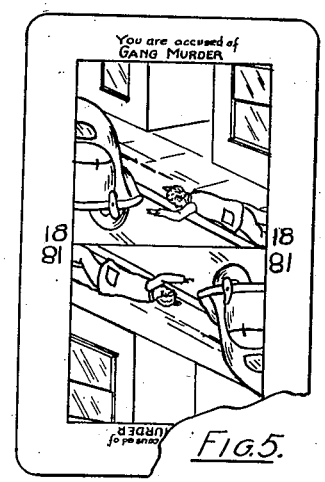

Fig. 5 a card indicating gang murder and the accused.

Figure 6:
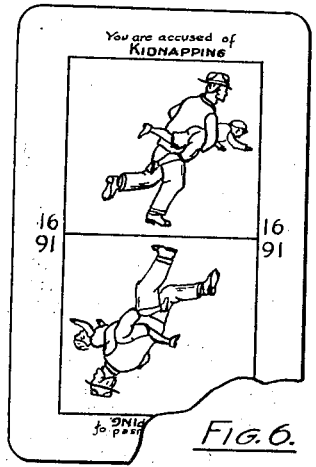

Fig. 6 a card indicating kidnapping and the accused.

Figure 7:
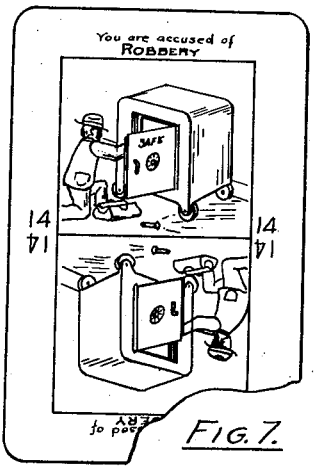

Fig. 7 a card indicating robbery and the accused.

Figure 8:
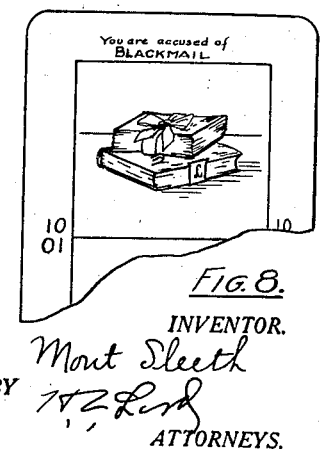

Fig. 8 a card indicating blackmail and the accused.

Fig. 9 a selecting board for the cipher cards.

Fig. 10 a group of murder clue cards.

Fig. 11 a group of gang murder clue cards.

Fig. 12 a group of kidnapping clue cards.

Fig. 13 a group of robbery clue cards.

Figure 14:
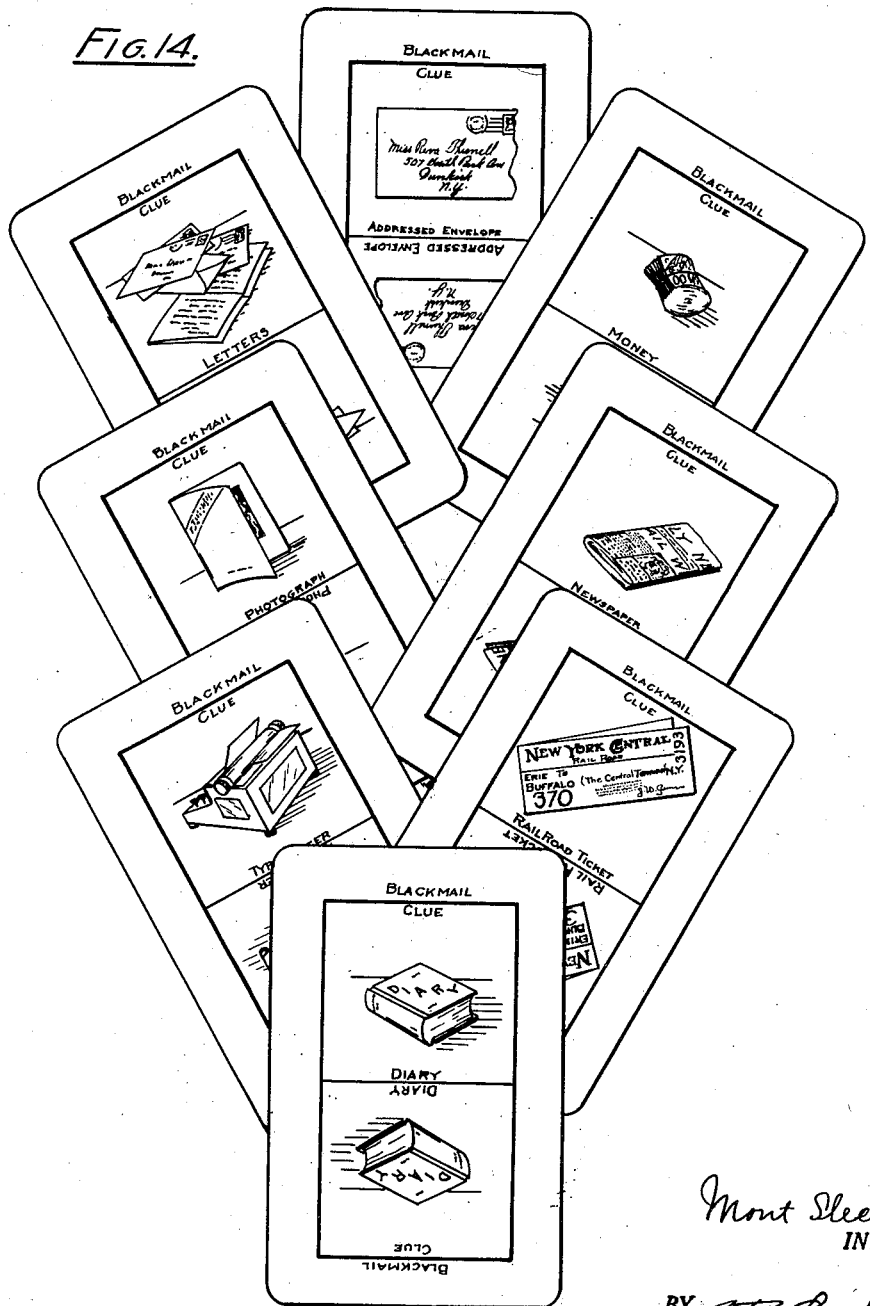

Fig. 14 a group of blackmail clue cards.

The key cards illustrated in Fig. 2 are provided in pairs, each card of a pair being a duplicate. As shown there are four pairs of these key cards numbered consecutively 1 to 4. Each of these key cards has a series of questions, directions and answers. For instance on key card 1, there are the questions A, B, C and R. There are the directions N, S and Z. There are the answers D, E, F, G, H, I, J, K, L, M, N, O, P and Q. All the key cards have identically the came questions and answers, but the designating symbols for the questions and answers are stepped up. Thus on key cards 2 the symbol B identifies the question: "Will you be my pal?" In the key card 3 the symbol C identifies the same question. So that the symbols of each pair do not match the question, answers, or directions of any other pair. In the game as played as many key cards are used as there are players, one key card being dealt to a player.

There is also dealt to each player one of the cards illustrated in Figs. 3 to 8. These cards, Figs. 3 to 8, depict and have legends indicating the detective, or accuser, Fig. 3, and the crime and accused, Figs. 4 to 8. As shown, cards Figs. 4 to 8 indicate the crimes of murder, gang murder, kidnaping, robbery and blackmail, but it will be understood that the crimes may be changed on these cards and the number of cards and crimes depicted increased, or changed, as desired, providing the key cards are similarly changed to list the same crimes.

Groups of clue cards are illustrated in Figs. 10 to 14, each group of clue cards having relation to one particular crime. Thus the clue cards "Murder" in Fig. 10 involve clues and are related to the crime card "Murder", Fig. 4; the clue cards "Gang murder", Fig. 11, to the crime card "Gang murder", Fig. 5; the clue cards "Kidnaping", Fig. 12 to the crime card "Kidnaping", Fig. 6; the clue cards "Robbery", Fig. 13, to the crime card "Robbery", Fig. 7; and the clue cards "Blackmail", Fig. 14, to the crime card "Blackmail", Fig. 8.

In playing the game, the key cards are first dealt, one card to each player. The crime cards including the detective card are dealt, one card to each player, these cards being dealt face down the number of crime cards dealt being, therefore, one less than the number of players including both the pairs and any odd player. If there are fewer players than the number of these cards, the surplus cards are discarded, the detective card always being retained. The clue cards are dealt promiscuously. It will be understood that if there are fewer players the clue cards of the crime cards not used are to be discarded from the pack so that the clue cards will have reference to the crime cards actually in play. The players are fixed by the key cards and the initial purpose of the game is to identify partners through the key cards. Those holding identical key cards are partners. If there are odd players the odd card player plays as a "lone wolf" or lone player. To establish this partnership, various questions are asked by the players through the cipher symbols. For example, should the detective have key card 1, he would select the cipher symbol C and indicate it either by speaking, or by selecting and indicating the symbol C on the cipher card with the question: "Will you be my S. P." (stool pigeon)? The player having the companion key card will answer by the cipher symbol O and thus becomes a partner with the detective.

In order to expedite the selection and communication of the cipher the following means may be provided (see Fig. 9) which is merely a piece of cardboard 1 having notches 2 cut in the edges of the cardboard of a size to receive one of the cipher symbols shown in the card in Fig. 1.

There are enough of these cipher cards, Fig. 1, to supply each partner and at the beginning of the game the choice is made whether the cipher symbols shall be expressed audibly, or through a cipher card. If a cipher card is selected the question C, for instance, would be asked by the party asking the question, who, in the above example would be the detective and he would place "C" in the notch where he was playing. The party having the companion card would recognize that this question would apply to him and reply by placing the symbol "O" of the cipher in the notch. The next question probably asked by the detective would be: "What are you accused of?" and to ask this question he would display the symbol "R" in the notch in the card. Following a display of the symbol "R" the stool pigeon would answer by displaying the symbol I, J, K, L, M, or N as the case might be. The next question, for example, of the detective might be: "How many clues have you of?" and by a second movement on his cipher card to the symbol I, J, K, or L complete the question as to the number of clues his stool pigeon has as to one crime. Learning the number of clues of the crimes gives the detective the total number of clues in the combined hands and picking the crimes of which they have the greater number of clues the detective signals "Hold all clues of" by displaying "N" in the notch and a second display in the same notch of the symbol of the particular crime the clue cards of which it is desired to hold.

Each of the players has this same privilege. The first question of those accused would be ordinarily "Will you be my pal?" And if that party had the key card 2 he would do this by displaying the symbol "B" and in that instance the companion key card would answer by displaying the symbol "P". This second player could, through the same system of questions and communications that we have illustrated for the detective get the information as to partners, and the crimes of which the partner is accused and the pal can learn from his partner the crime of which the partner is accused and the number of clues. This questioning continues until somebody is satisfied that he has the information he desires when that party has the privilege of stopping further questioning provided the detective has not announced an arrest, or some player has not announced the "defeat of justice" as hereinafter described by saying "Scram." Whereupon each of the players passes to the next player on his right one of the clue cards which it is desired to discard. The pass to the next player must be made prior to the disclosure of the card received.

This purpose of questioning and locating clue cards checks into the general scheme, or purpose of the game. The number of clue cards controls the count as hereinafter described. If the detective finds that he has, in the combined hands, five clue cards he announces an arrest for that particular crime and if the cards indicate that the clue cards in his hand and the stool pigeon's do justify this statement he then obtains the counts applied to that situation and the different players are rated in counts in accordance with the status then established and that particular investigation is closed.

In the show-down the count is as follows: The detective would obtain for the proper designation of an arrest for murder 20 points; gang murder 18 points, kidnapping 16 points, robbery 14 points, blackmail 10 points, and the stool pigeon one-half as many points. If the detective thinks he and his stool pigeon can arrest two criminals he may instruct his stool pigeon, through a cipher communication, to hold the clue cards for two crimes. If he thinks he cannot get enough clues to arrest for the crime that he is investigating he may change his investigation to another crime by notifying his stool pigeon. If he comes to an impasse and cannot get the clues that he is after he may give up the investigation and a new investigation begins. If, however, before the detective gives up the investigation any player has "defeated justice" as hereinafter described, even though unannounced, he is, or they are, accorded the counts arising from this situation. Should, however, the detective make a mistake and does not have the clues to justify the arrest he is liable for a false arrest and is fined two points which is credited to the player falsely arrested. If he arrests his own stool pigeon he shows bad faith and both he and his stool pigeon loses two points. The stool pigeon may avoid this possibility by refusing to play and thus communicate his hand to the detective, in which case the detective and the stool pigeon play lone hands and are subject to the same penalties and possibilities of counts as a player playing a lone hand.

Meantime and up to the point where the detective stops the progress of the investigation of that particular crime by asserting an arrest the other players through the questioning establish their pals, that is, the player holding the duplicate of the key card and if these two pals collect five clues of each of their crimes, 10 clues in all, they have, according to the scheme "defeated justice" and are entitled to ten points each. They may make this assertion before the detective asserts an arrest and upon such an assertion that investigation is concluded and there is a show-down for the count, it being understood that the assertion of an arrest by the detective is also the end of an investigation. Any of the accused may refuse to recognize a pal and may play alone. If any player at the time of the arrest, that is, the show-down, holds a clue pertaining to the crime for which the accused is arrested, he is identified as an Accessory after the fact and is fined two points for each of these clues so held. The arrested accused, and his pal are also fined two points per clue for their alleged part in the crime. It will be understood that at any time prior to the player holding the detective card asserting an arrest, any player being satisfied that his information is complete may signal for a change of cards by calling "Scram", but this particular player cannot repeat the signal until some other player has used the signal.

Should a player, except the stool pigeon, feel that he has discovered the crime the detective is investigating and that he has clues enough to aid the detective he may turn "State's evidence" by placing his cards face up on the table. The detective may accept his clues in his counting in which case the player turning "State's evidence" is relieved of count against him for the clues. If the detective does not accept the clues the party turning "State's evidence" is, according to the scheme of the game, held guilty of perjury and fined two points.

When a player refuses to play with the person who would otherwise be his partner, this is declared by the answer "No" to the question "Will you be my pal?" or "stool pigeon?", as the case may be. It is advisable to do this only when the player holds five clues to his own crime in his own hand. With such a play the count is ten points for the person playing the lone hand and the person who would have been his partner, or pal, receives no count unless he earns it by his own playing.

When a player becomes convinced that evidence is piling up against him in the hands of the detective, he may show through his code card "Release". This instructs his partner to pass on the clue cards which he may have been previously instructed to hold. This grants the partner the opportunity to relieve himself of being accused of being accessory after the fact.

The different crimes and the different clues thereto may be identified by different colors on the cards, if desired, as for instance, murder may have red, gang murder yellow, kidnapping purple, robbery blue, blackmail green. The key cards and cipher cards may be further distinguished by variations in color, if desired. All the key cards contain the symbol "Z" with the legend "Attention", the purpose of which is to communicate to a player some inattention, or failure in the information given. This symbol may be placed in the player's slot in the selecting board as other symbols.

The game may be given any number of points. Ordinarily fifty points are used as the measure of a game.

What I claim as new is:

1. In a card game, a pair of key cards having indicia thereon forming means of communication between the holders thereof comprising units giving information, each unit being identified by a cipher symbol and other cards accompanying each key card having indicia thereon having relation to the information communicable through the key cards, the identity of which may be communicated by disclosure of the cipher symbols on the key cards.

2. In a card game, a pair of key cards having indicia thereon forming means of communication between the holders thereof comprising units giving information, each unit being identified by a cipher symbol and other cards accompanying each key card having indicia thereon specifying crimes and clues thereto, the identity of which may be communicated by disclosure of the cipher symbols on the key cards.

3. A card game comprising key cards in pairs, each pair having indicia thereon comprising similar questions and answers, the questions and answers of the same pair being identified with the same cipher symbols and similar symbols on different pairs being associated with different questions and answers and other cards accompanying the key cards having indicia thereon having relation to the information communicable through the key cards, the identity of which may be communicated between the holders of a pair of key cards by disclosure of cipher symbols on the key cards.

4. A card game comprising key cards in pairs, each pair having indicia thereon comprising similar questions and answers, the questions and answers of the same pair being identified with the same cipher symbols and similar symbols on different pairs being associated with different questions and answers, other cards accompanying the key cards, one of such other cards comprising indicia thereon designating a detective, other cards comprising indicia thereon designating crimes, one for each key card, and still other cards comprising indicia thereon designating clues, the identity of the detective, crime and clue cards accompanying the key cards of a single pair being communicable by the disclosure of the cipher symbols of said key cards.

5. In a card game, a pair of key cards having indicia thereon forming means of communication between the holders thereof comprising units giving information, each unit being identified by a cipher symbol; other cards accompanying each key card having indicia thereon related to the information communicable by the key cards, the identity of which may be communicated by disclosure of the cipher symbols of the key cards; cards, one for each player, accompanying each key card comprising indicia thereon designating the accused, the accuser, and the crimes of the accused; and groups of clue cards comprising indicia thereon designating clues, one group for each crime, said clue cards being distributable promiscuously with relation to the key cards and each having relation to the communicable information on the key cards.

MONT SLEETH.